US012246943B2

(12) United States Patent
Carrara

(10) Patent No.: US 12,246,943 B2
(45) Date of Patent: Mar. 11, 2025

(54) ELEVATOR CAR

(71) Applicant: Inventio AG, Hergiswil (CH)

(72) Inventor: Elena Carrara, Lucerne (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/571,285

(22) PCT Filed: Jun. 23, 2022

(86) PCT No.: PCT/EP2022/067164
§ 371 (c)(1),
(2) Date: Dec. 18, 2023

(87) PCT Pub. No.: WO2022/268948
PCT Pub. Date: Dec. 29, 2022

(65) Prior Publication Data

US 2024/0279025 A1 Aug. 22, 2024

(30) Foreign Application Priority Data

Jun. 25, 2021 (EP) .................................... 21181662

(51) Int. Cl.
*B66B 11/02* (2006.01)

(52) U.S. Cl.
CPC ................................ *B66B 11/0226* (2013.01)

(58) Field of Classification Search
CPC .................................................. B66B 11/0226
See application file for complete search history.

(56) References Cited

FOREIGN PATENT DOCUMENTS

| | | | | | |
|---|---|---|---|---|---|
| CN | 103159112 | A | * | 6/2013 | |
| CN | 206814229 | U | | 12/2017 | |
| CN | 107792758 | A | * | 3/2018 | ......... B66B 11/0226 |
| CN | 109552968 | A | * | 4/2019 | |
| CN | 111924681 | A | * | 11/2020 | ............. A47C 1/121 |
| JP | 2002037572 | A | | 2/2002 | |
| JP | 2007230281 | A | | 9/2007 | |
| JP | 2008280164 | A | | 11/2008 | |
| KR | 20090130909 | A | * | 12/2009 | |
| KR | 20100103116 | A | * | 9/2010 | |
| KR | 101066890 | B1 | | 9/2011 | |
| WO | 2017033038 | A1 | | 3/2017 | |

OTHER PUBLICATIONS

Machine Translation of CN 206814229.*
Machine Translation of KR 20090130909.*

* cited by examiner

*Primary Examiner* — Diem M Tran
(74) *Attorney, Agent, or Firm* — William J. Clemens; Shumaker, Loop & Kendrick, LLP

(57) ABSTRACT

An elevator car has car walls that form an interior for passengers. A handrail providing a rest surface for passengers is disposed in the interior on at least one of the car walls. The handrail rest surface has a height of at least 15 cm and is inclined, relative to the vertical, by an angle of inclination between 5° and 20°. The handrail can be L-shaped with two handrail portions, wherein one of the handrail portions is shorter than the other handrail portion.

17 Claims, 2 Drawing Sheets

ELEVATOR CAR

FIELD

The invention relates to an elevator car for an elevator.

BACKGROUND

Elevators for conveying persons and goods contain elevator cars that can be moved up and down in an elevator shaft. The cars can be moved by means of a drive unit using suspension means, for example in the form of suspension cables or suspension belts. In general, the elevator car has a cuboid car body comprising a floor, doors, walls (side walls, rear wall) and a ceiling. The passengers are in the interior of the car body while the car moves. Handrails are frequently arranged in the cars; passengers, for example elderly persons, can hold on to the handrails, thus ensuring their wellbeing and sense of safety.

SUMMARY

The present invention addresses the problem of providing an elevator car having a handrail in the interior of the car, the elevator car being characterized by improved comfort. This problem is solved according to the invention by means of an elevator car having the features described herein. The elevator car comprises car walls which form an interior for passengers and/or goods. The car walls can be two mutually opposite side walls and a rear wall connecting the side walls. Since the handrail is designed as a rest for passengers, an improvement in the comfort of the handrail is achieved. Passengers can comfortably lean against the handrail while the car moves. In particular when passengers are enclosed in the car during an unplanned, relatively long standstill, comfortable support for the passengers is useful.

The rest preferably defines a rest region for the buttocks and/or lower back of a passenger. The handrail can be designed for a model person. Depending on the geographical area of use and other demographic factors, this model person can, for example, be an adult person with a height of, for example, 175 cm.

From an ergonomic point of view, it is advantageous and particularly pleasant for the feeling of comfort if the handrail has a rest surface with a height of at least 15 cm, preferably at least 20 cm. If necessary, the height of the rest surface of the handrail can even be 30 cm and greater. Thanks to the comparatively large rest surface, the passenger can sit or lean on the handrail in a relaxed manner and, if necessary even for a comparatively long time, with comfort. A handrail of this type provides the passenger with sense of comfort like in a lounge. Another advantage of a handrail which is designed as a rest for passengers and which has a comparatively high rest surface is improved safety. The handrail can serve as an impact surface which can catch persons in the event of a fall.

The handrail designed as a rest for passengers can have an upper edge which forms a hand grip region that passengers can hold on to when required. The upper edge terminates the handrail at the top. The upper edge of the handrail can, for example, be at a height of approximately 80 cm (preferably between 70 and 100 cm) above the walking surface of the car floor. Handrails at such a height are also known and commonplace in conventional elevator cars with handrails. For the handrail designed as a rest for passengers, it can have an elevated upper edge for supporting at least the lower back of passengers. The upper edge can be at a height of 90 to 110 cm above the car floor. The passenger can thus comfortably lean against the handrail also with their lower back.

The handrail designed as a rest for passengers can have a lower edge which is less than 70 cm and preferably less than 60 cm away from the walking surface of the car floor. The handrail designed as a rest for passengers can thus reach downward toward the walking surface of the car floor to such an extent that the lower edge is comparatively close to the car floor, i.e. is less than 60 cm away from the walking surface of the car floor. Here, the term “edge” is not understood to mean a sharp edge; the edge can of course be rounded. However, the edge could also have a rectangular outer contour in cross section. Other shapes for the handrail are also conceivable. Instead of the mentioned lower edge, the handrail could also have another lower end which is less than 60 cm away from the walking surface of the car floor. The sense of comfort for passengers and the safety of the handrail can be increased further in this way.

The handrail designed as a rest for passengers can comprise a rest surface which extends substantially plane-parallel to the adjacent vertical car wall. In particular from an ergonomic point of view, it can be advantageous if the handrail designed as a rest for passengers is inclined, with respect to its rest surface, relative to the vertical, wherein the angle of inclination of the rest surface relative to the vertical is between 5° and 20° and preferably between 5° and 15°. In the case of a handrail inclined in this way, the rest surface is oriented slightly upward for comfortable leaning. In other words, the surface normal of the rest surface points upwards. This handrail is characterized by particularly favorable ergonomics.

The rest surface can have a constant angle of inclination over substantially the entire height of the handrail. However, it is also conceivable that the rest surface has a varying angle of inclination relative to the vertical over the height. For example, the handrail can have, in the region of the upper end or end facing the upper edge, an angle of inclination relative to the vertical which is greater than the angle of inclination of the handrail in the region of the lower end.

With respect to its rest surface, the handrail can have a concave, convex or flat outer shape in the vertical cross section.

If the elevator car comprises two car walls connected to one another via a corner, it can be advantageous if the handrail has an L-shape in plan view in order to bridge the corner. The L-shaped handrail is adapted to the corner and allows comfortable leaning against the handrail in the corner region. The L-shaped handrail associated with two side walls is preferably formed as a single piece. Alternatively, it would also be conceivable that the handrail has a U-shape in plan view, whereby the handrail contacts three car walls.

It is advantageous if the L-shaped handrail has two handrail portions, each assigned to a car wall and each extending in the horizontal direction, one handrail portion being shorter than the other handrail portion.

It can be particularly advantageous if the L-shaped handrail has, in order to form a single seat in the corner, a short handrail portion which extends in the horizontal direction and which has a side length measured in the horizontal direction of at most 50 cm and preferably at most 40 cm.

For improvement in comfort, it can be advantageous if the handrail is covered or overlaid with a textile material at least in the region of the rest surface. Textile materials can be woven fabrics, knitted fabrics, knittings, braided fabrics, stitch-bonded fabrics, nonwoven fabrics, and felts. However, leather or artificial leather is also conceivable instead of textile materials.

Furthermore, the handrail designed as a rest for passengers can have padding, formed for example by foam material. The foam material could be arranged between the textile material which defines the outer surface, and a support structure for the handrail.

If the elevator car comprises a car wall to which the handrail is fastened, it can be advantageous for further improvement in comfort if the car wall is covered, at least in a wall region or wall segment above the handrail, with a textile material in order to form a textile back rest surface for passengers. Thus the upper back is also provided a pleasant leaning possibility by the textile wall surface. The car wall can be completely covered with textile material. However, the car wall can also be divided into two or more wall segments in the vertical direction. A lower wall segment, which is arranged below the handrail, can be equipped without textile covering. An upper wall segment of the car wall arranged above said wall segment can be covered with textile material. The upper wall segment covered with textile material can reach up to the car ceiling. It is of course also conceivable that a non-textile wall segment is additionally provided above the upper textile wall segment.

The handrail can have a shell-type profiled body for defining a support structure for the handrail. The profiled body can be manufactured from metal materials, for example. For example, the profiled body can be formed from one or more metal sheets. It is also conceivable that the profiled body is formed as an injection molded part from a plastic material. The profiled body can be covered or overlaid with the textile material.

DESCRIPTION OF THE DRAWINGS

Further individual features and advantages of the invention can be derived from the following description of exemplary embodiments and from the drawings. In the drawings.

DETAILED DESCRIPTION

Figure 1:
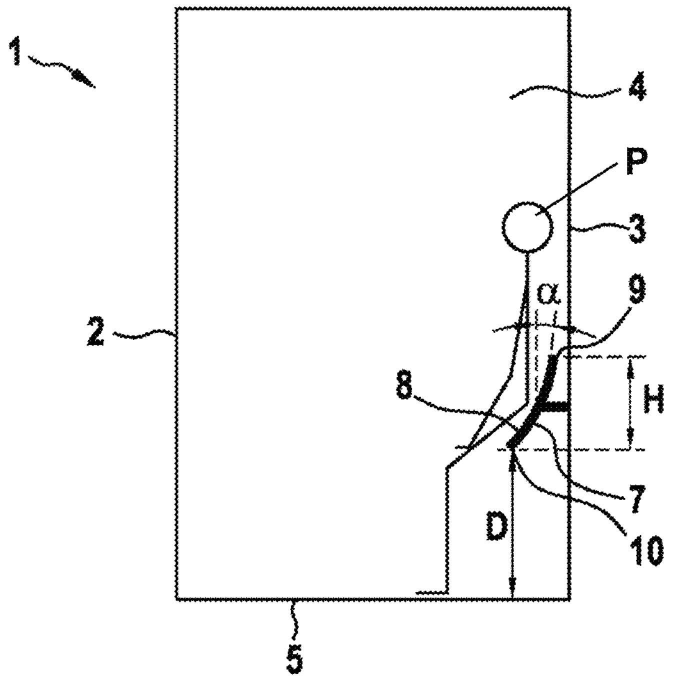
FIG. 1 shows a highly simplified schematic illustration of an elevator car according to the invention.

FIG. 1 shows an elevator car for elevators labeled 1. Elevators are used for vertical transport in multistory buildings. The buildings have elevator shafts in which the elevator car 1 can be moved up and down to individual floors. The elevator car 1 is moved by suspension means (not shown here), to which the elevator car 1 is fastened; the suspension means can be one or more suspension cables or suspension belts. The elevator car 1 can, for example, be self-supporting or be arranged in a supporting structure, such as a supporting frame. In the present case, the elevator car 1 shown in FIG. 1 has, in simplified form by way of example, a cuboid car body and comprises a car floor 5, car walls and a ceiling. The car walls include mutually opposite side walls 2, 3 and a rear wall 4 connecting the side walls to one another. In addition, the elevator car 1 has a door (not shown), which closes the open front side and thus the interior of the elevator car 1.

A special handrail 7 is mounted on the side wall 3. The handrail 7 is characterized in that it is designed as a rest for passengers. The person P can thus comfortably lean against the handrail 7 and can stay in the car 1 in the position shown in FIG. 1, the position being like sitting but still being more or less upright. The handrail 7 has a rest surface with a comparatively large height. In order to enable comfortable support of the person P, the height H of the handrail 7 designed as a rest for passengers is at least 15 cm and preferably at least 20 cm.

The handrail 7 has an upper edge 9 which forms a hand grip region that passengers can hold on to when required. Furthermore, the handrail 7 has a lower edge 10 which reaches downward toward the walking surface of the car floor 5 to such an extent that the lower edge 10 is less than 60 cm away from the walking surface of the car floor 5. The distance of the lower edge 10 from the car floor 5 is denoted by D.

The handrail 7 designed as a rest for passengers is clearly inclined, with respect to its rest surface, relative to the vertical. The corresponding angle of inclination of the rest surface relative to the vertical is denoted by a. The angle of inclination a of the slightly upwardly directed rest surface is between 5° and 20° and preferably between 5° and 15°.

Figure 2:
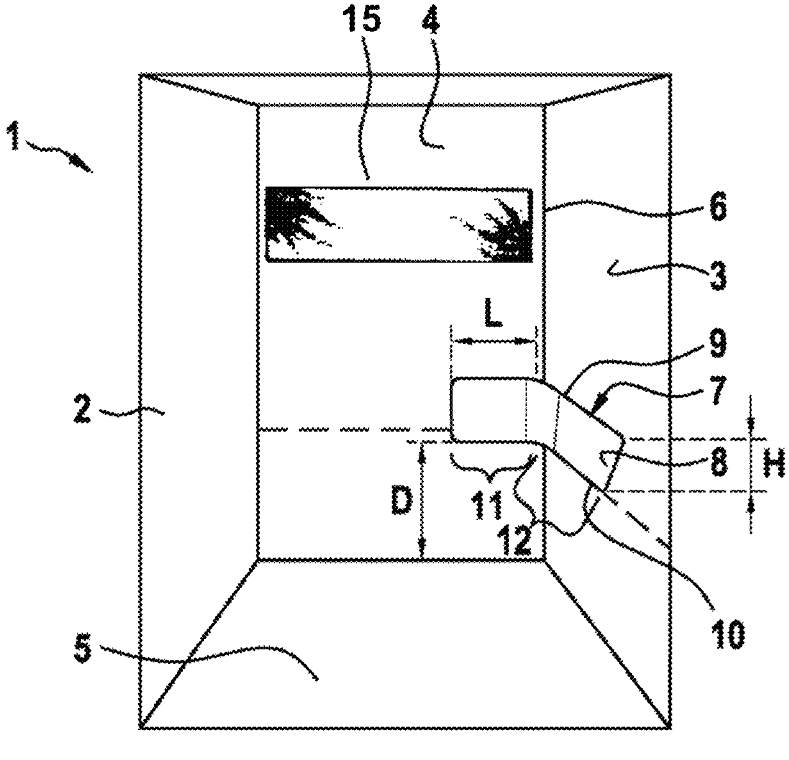
FIG. 2 shows a simplified perspective illustration of another elevator car.

FIG. 2 shows a variant of the handrail 7 designed as a rest for passengers, in which the handrail 7 is arranged in a corner region of the car 1. The car walls 3 and 4 of the elevator car 1 are connected to one another via a corner 6. The handrail 7 has an L-shape in a plan view in order to bridge the corner 6. The L-shaped handrail 7 has two handrail portions 11, 12, each associated with a car wall 3, 4 and each extending in the horizontal direction. The handrail portion 11 which in the present case is associated with the rear wall 4 by way of example is shorter than the other handrail portion 12. Due to the fact that the L-shaped handrail 7 has a short handrail portion 11 with a side length of at most 50 cm and preferably at most 40 cm, an advantageous single seat can be obtained in the corner 6.

The handrail 7 can be covered or overlaid with a textile material at least in the region of the rest surface 8. However, nonwovens, leather, artificial leather or other materials commonplace for example in seating furniture are also conceivable instead of textile materials. In addition to aesthetic advantages, the textile rest surface 8 has the advantage that leaning persons can slip less easily, which ultimately also has a positive effect on personal safety.

The car walls can be segmented. In FIG. 2, horizontal separating lines for defining the segments in the car walls 3 and 4 are indicated by dashed lines. The car walls 3, 4 can be covered, at least in the wall segment designated 15 above the handrail 7 with a textile material in order to form a textile back rest surface for passengers. However, leather or artificial leather is also conceivable instead of textile materials such as woven fabrics, knitted fabrics, knittings, braided fabrics, stitch-bonded fabrics, nonwoven fabrics, and felts. Materials which, for example, are also commonplace in seating furniture for covering the furniture can be used, as desired, as material with which to cover or overlay the car wall.

The car walls 2, 3 and 4 can be constructed in multiple parts and can each consist of a lower wall panel and an upper wall panel. The respective panels are horizontally abutting wall panels and can define wall segments. The wall panels can be made of metal sheets and can each be manufactured from a sheet-metal blank.

Figure 3:
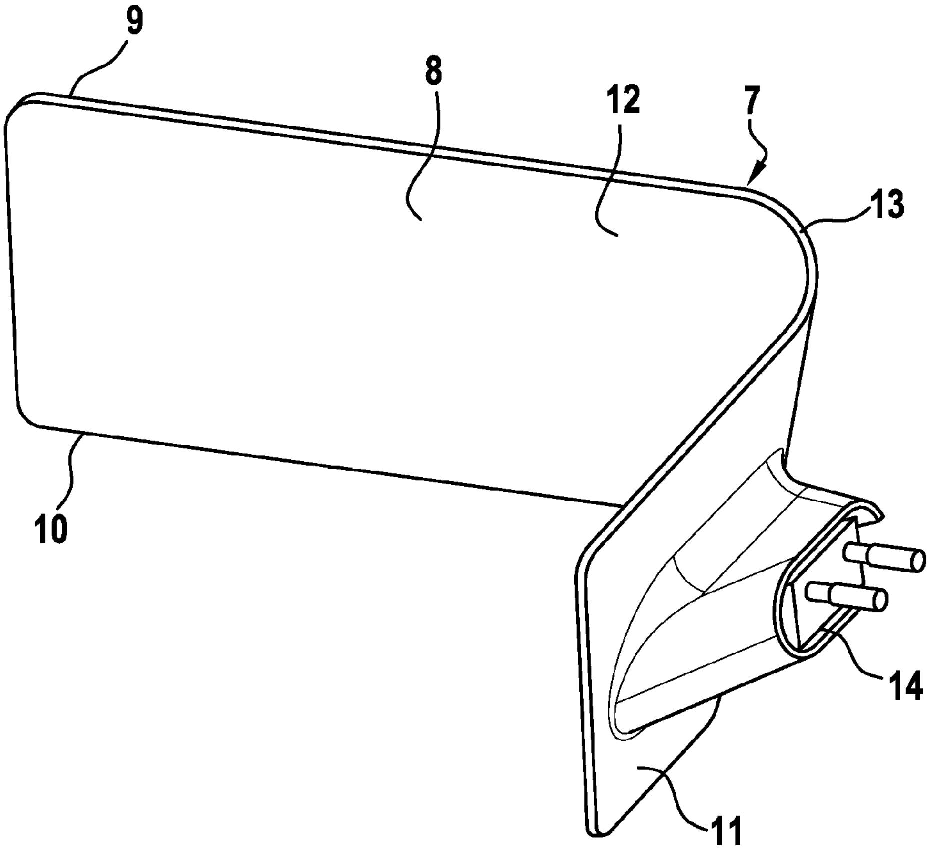
FIG. 3 shows a perspective illustration of a handrail for the elevator car shown in FIG. 2.

Constructional details of a handrail 7 designed as a rest for passengers can be found in FIG. 3. The handrail 7 shown in FIG. 3 is similar to the handrail 7 shown in FIG. 2, but is configured to bridge the corner where the car walls 2 and 4 are connected. The handrail 7 has a shell-type profiled body 13 for defining a support structure for the handrail 7. A connection element on the handrail portion 11 by which the handrail 7 can be fastened to the car wall, for example by means of screws, is denoted by 14. Another connection element 14 (not shown) can be provided on the handrail portion 12. The profiled body 13 can be formed from metal sheets.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A elevator car comprising:

a plurality of car walls and a car floor forming an interior space for passengers;

a handrail arranged in the interior space and mounted on at least one of the car walls;

wherein the handrail includes a rest surface for the passengers; and wherein the handrail is mounted on two of the car walls that are connected to one another via a corner, the handrail having an L-shape in plan view and bridging the corner, the handrail having two handrail portions, each of the handrail portions being associated with one of the two car walls, and each of the handrail portions including the rest surface for the passengers extending along the associated car wall.

2. The elevator car according to claim 1 wherein the rest surface has a height of at least 15 cm or at least 20 cm.

3. The elevator car according to claim 1 wherein the handrail has a lower edge that is less than 60 cm away from a walking surface of the car floor.

4. The elevator car according to claim 1 wherein the handrail is inclined, with respect to the rest surface, relative to a vertical direction, wherein an angle of inclination of the rest surface relative to the vertical direction is between 5° and 20° or is between 5° and 15°.

5. The elevator car according to claim 1 wherein the handrail has two handrail portions, each of the handrail portions being associated with one of the two car walls, and wherein one of the handrail portions is shorter than another of the handrail portions in a horizontal direction.

6. The elevator car according to claim 5 wherein the shorter handrail portion has a side length of at most 50 cm or at most 40 cm in the horizontal direction thereby forming a single seat for passengers in the corner.

7. The elevator car according to claim 1 wherein the handrail is covered or overlaid with a textile material at least in a region of the rest surface.

8. The elevator car according to claim 7 wherein one of the car walls is covered, at least in a wall segment thereof above the handrail, with a textile material forming a back rest surface for the passengers.

9. The elevator car according to claim 1 wherein the handrail has a shell-type profiled body defining a support structure for the handrail.

10. A handrail for an elevator car, the elevator car having a plurality of car walls and a car floor forming an interior space for passengers, the handrail comprising;

the handrail having an L-shape in plan view and being adapted to mount in the interior space on two of the car walls that are connected to one another via a corner thereby bridging the corner;

wherein the handrail has two handrail portions, each of the handrail portions being associated with one of the two car walls, and wherein one of the handrail portions is shorter than another of the handrail portions in a horizontal direction; and wherein each of the handrail portions includes a rest surface for the passengers.

11. The handrail according to claim 10 wherein the rest surface has a height of at least 15 cm or at least 20 cm.

12. The handrail according to claim 10 wherein the handrail has a lower edge and is adapted to mount in the interior space with the lower edge being less than 60 cm away from a walking surface of the car floor.

13. The handrail according to claim 10 wherein the handrail is inclined, with respect to the rest surface, relative to a vertical direction, wherein an angle of inclination of the rest surface relative to the vertical direction is between 5° and 20° or is between 5° and 15°.

14. The handrail according to claim 10 wherein the shorter handrail portion has a side length of at most 50 cm or at most 40 cm in the horizontal direction thereby forming a single seat for passengers in the corner.

15. The handrail according to claim 10 wherein the handrail is covered or overlaid with a textile material at least in a region of the rest surface.

16. The handrail according to claim 10 wherein the handrail has a shell-type profiled body defining a support structure for the handrail.

17. A elevator car comprising:

a plurality of car walls and a car floor forming an interior space for passengers;

a handrail arranged in the interior space and mounted on at least one of the car walls;

wherein the handrail includes a rest surface for the passengers;

wherein the handrail is covered or overlaid with a textile material at least in a region of the rest surface; and wherein one of the car walls is covered, at least in a wall segment thereof above the handrail, with a textile material forming a back rest surface for the passengers.

* * * * *